(12) United States Patent
Miyata

(10) Patent No.: US 7,877,085 B2
(45) Date of Patent: Jan. 25, 2011

(54) PORTABLE ELECTRONIC DEVICE CAPABLE OF RECEIVING DISTRIBUTED CONTENTS, CONTENT INFORMATION SERVER, AND CONTENT LIST PROVIDING METHOD FOR CONTENT DISTRIBUTION SYSTEM AND RECORDING MEDIUM RECORDING PROGRAM FOR PROVIDING CONTENT LIST

(75) Inventor: Katsuya Miyata, Kanagawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 978 days.

(21) Appl. No.: 11/726,606

(22) Filed: Mar. 22, 2007

(65) Prior Publication Data

US 2007/0232221 A1 Oct. 4, 2007

(30) Foreign Application Priority Data

Mar. 31, 2006 (JP) .............................. 2006-101182

(51) Int. Cl.
*H04W 4/02* (2009.01)
(52) U.S. Cl. .................. 455/414.3; 455/456.3; 455/524
(58) Field of Classification Search ........................ None
See application file for complete search history.

(56) References Cited

U.S. PATENT DOCUMENTS

| 6,169,897 | B1 * | 1/2001 | Kariya ..................... 455/456.3 |
| 7,006,835 | B2 * | 2/2006 | Otsuka et al. .......... 455/456.3 X |
| 7,532,900 | B2 * | 5/2009 | Wilson et al. ............ 455/456.3 |
| 7,587,208 | B2 * | 9/2009 | Sharma et al. ......... 455/456.3 X |
| 7,672,280 | B2 * | 3/2010 | Shim et al. ............ 455/456.1 X |
| 2003/0137951 | A1 | 7/2003 | Otsuka et al. |

FOREIGN PATENT DOCUMENTS

| JP | 2000-125333 | 4/2000 |
| JP | 2001-308856 | 11/2001 |
| JP | 2001-318925 | 11/2001 |
| JP | 2002-157182 | 5/2002 |
| JP | 2003-158726 | 5/2003 |
| JP | 2003-158730 | 5/2003 |
| KR | 1020050039004 | 4/2005 |
| WO | WO 2005/076499 | 8/2005 |
| WO | WO 2005/125238 | 12/2005 |

\* cited by examiner

*Primary Examiner*—Philip J Sobutka
(74) *Attorney, Agent, or Firm*—Cohen Pontani Lieberman & Pavane LLP

(57) ABSTRACT

Reception of a list including information on a content not receivable at a current location is avoided in acquiring a multicast content list.

A portable terminal searches a wireless base station which can communicate with the portable terminal at a current location thereof, and transmits available sector identification information for identifying the searched wireless base station to a content information server. Based on the available sector identification information and multicast detailed information on a content distributed by the wireless base station, the content information server transmits a list of contents receivable at the current location of the portable terminal to the portable terminal. The portable terminal selects a content from the content list in accordance with user's manipulation, and makes transition to a channel where the selected content is distributed based on the multicast detailed information.

13 Claims, 11 Drawing Sheets

MULTICAST DETAILED INFORMATION

| COMMUNICATION SYSTEM | FREQUENCY BAND (Hz BAND) | CHANNEL | PN | TRANSMITTABLE CONTENT | | | |
|---|---|---|---|---|---|---|---|
| | | | | 1 | 2 | 3 | ... |
| EV-DO | 800M | 100 | 100~200 | PROGRAM D | PROGRAM A | PROGRAM B | ... |
| EV-DO | 800M | 100 | 400~500 | PROGRAM E | NONE | NONE | ... |
| EV-DO | 800M | 100 | OTHER | PROGRAM A | PROGRAM B | PROGRAM C | ... |
| EV-DO | 800M | 200 | ALL | PROGRAM A | PROGRAM B | PROGRAM C | ... |
| EV-DO | 800M | 300 | ALL | PROGRAM F | PROGRAM G | NONE | ... |
| EV-DO | 2G | 150 | ALL | PROGRAM H | PROGRAM I | PROGRAM J | ... |
| W-CDMA | 2G | 350 | ALL | PROGRAM H | NONE | NONE | ... |
| W-CDMA | 1.7G | 450 | ALL | PROGRAM A | PROGRAM C | NONE | ... |
| : | : | : | : | : | : | : | : |

FIG. 4

MULTICAST DETAILED INFORMATION

| PROGRAM IDENTIFIER (901) | PROGRAM NAME (902) | START TIME (903) | END TIME (904) | IP ADDRESS (905) | PORT (906) | |
|---|---|---|---|---|---|---|
| 100 | PROGRAM A | 13:00 | 14:00 | 224.0.0.1 | 10 | ... |
| 110 | PROGRAM B | 13:00 | 14:00 | 224.0.0.1 | 20 | ... |
| 120 | PROGRAM C | 10:00 | 14:00 | 224.0.0.2 | 10 | ... |
| 130 | PROGRAM D | 10:00 | 15:00 | 224.0.0.3 | 20 | ... |
| 140 | PROGRAM E | 13:00 | 15:00 | 224.0.0.4 | 30 | ... |
| 150 | PROGRAM F | 13:00 | 14:00 | 224.0.0.5 | 40 | ... |
| 160 | PROGRAM G | 13:30 | 20:00 | 224.0.0.6 | 50 | ... |
| 170 | PROGRAM H | 13:30 | 20:00 | 224.0.0.7 | 60 | ... |
| : | : | : | : | : | : | : |

FIG. 9

PORTABLE ELECTRONIC DEVICE CAPABLE OF RECEIVING DISTRIBUTED CONTENTS, CONTENT INFORMATION SERVER, AND CONTENT LIST PROVIDING METHOD FOR CONTENT DISTRIBUTION SYSTEM AND RECORDING MEDIUM RECORDING PROGRAM FOR PROVIDING CONTENT LIST

BACKGROUND OF THE INVENTION

1. Field of the Invention

The present invention relates to a portable electronic device that has a communication function relating to a multicast service, a content information server, a content list providing method, and a recording medium.

2. Description of the Related Art

There is proposed a communication device that allows plural terminals to simultaneously receive content data, using a multicast service.

3GPP2 Specification C. S0005-Rev. D and 3GPP2 Specification C. S0054 disclose a specific method for providing a multicast service through cellular phones.

Unexamined Japanese Patent Application KOKAI Publication No. 2001-308856 discloses a method of causing a wireless terminal located within the service area of an information distribution device to receive management information, which associates information for identifying a multicast content with a wireless channel used for distribution of the multicast content, from the information distribution device, and providing the multicast content to the wireless terminal through the wireless channel used for the distribution of the multicast content indicated by the management information.

Unexamined Japanese Patent Application KOKAI Publication No. 2003-158726 discloses a method of causing a reception terminal to transmit current location information (for example, a zip code, a telephone number) indicating the current location thereof to a program information server together with a channel number, and to receive information on contents in accordance with the current location from the program information server.

According to this method, when contents and contents distribution schedules differ for large measures like prefecture-by-prefecture, only information on contents distributed at the current location of the reception terminal can be received. When the contents and the contents distribution schedules differ sector-by-sector, however, it is necessary to store enormous quantity of program information in the program information server sector by sector.

Further, nowhere in Unexamined Japanese Patent Application KOKAI Publication No. 2003-158726 is disclosed a method of searching a base station with which the reception terminal can communicate at the current location thereof and transmitting information for specifying the searched base station to the program information server.

SUMMARY OF THE INVENTION

The present invention has been made in view of the foregoing problems, and it is an object of the invention to provide a portable electronic device which receives information on contents receivable at a current location but does not receive information on contents unreceivable at the current location as much as possible, a contents server, a contents list providing method, and a recording medium relating to the same.

Another object of the invention is to make acquisition and provision of information on multicast contents receivable at a current location of a portable electronic device efficient.

To achieve the objects, a portable electronic device of the invention comprises:

a base station detection unit that detects a wireless base station which can communicate with the portable electronic device at a current location thereof;

a base station information transmission unit that produces base station identification information for identifying the wireless base station detected by the base station detection unit, and transmits the base station identification information to a content information server;

a list reception unit that receives a content list, which represents a list of contents distributed by an information distribution device through the wireless base station indicated by the base station identification information transmitted from the base station information transmission unit, from the content information server;

an output unit that outputs the content list received by the list reception unit;

a content selection unit that selects a content from the contents indicated in the content list output by the output unit in accordance with manipulation of a user; and a content reception unit that receives the content selected by the content selection unit from the information distribution device through the wireless base station detected by the base station detection unit.

To achieve the objects, a content information server of the invention comprises:

a content-detailed-information storing unit that stores information on a wireless base station and information representing a detail of a content distributed by an information distribution device through the wireless base station, in association with each other;

a base station information reception unit that receives base station identification information for identifying a wireless base station which can communicate with a portable electronic device at a current location thereof from the portable electronic device;

a list producing unit that produces a content list indicating a content distributed by the information distribution device through a wireless base station which can communicate with the portable electronic device at a current location thereof based on the base station identification information received by the base station reception unit and information stored in the content-detailed-information storing unit; and a list transmission unit that transmits the content list produced by the list producing unit to the portable electronic device.

To achieve the objects, there is provided a content list providing method for providing a list of contents which are receivable at a current location of a portable electronic device of the invention.

To achieve the objects, there is provided a recording medium storing a program that allows a computer to realize the main functions of the invention.

According to the invention, information on programs (contents) receivable at a current location of the portable electronic device is acquired, but acquisition of information on programs (contents) unreceivable at the current location is avoided as much as possible.

Moreover, according to the invention, there are provided a portable electronic device which improves usability in using a multicast service, a content information server, a content list providing method and a recording medium relating to the same.

BRIEF DESCRIPTION OF THE DRAWINGS

These objects and other objects and advantages of the present invention will become more apparent upon reading of the following detailed description and the accompanying drawings in which:

FIG. 4 is a diagram illustrating an example of a data structure of multicast detailed information (list of transmittable programs) according to the first embodiment of the invention;

FIG. 9 is a diagram illustrating an example of a data structure of multicast detailed information (list of transmittable programs) according to the second embodiment of the invention;

DETAILED DESCRIPTION OF THE PREFERRED EMBODIMENTS

First Embodiment

Figure 1:
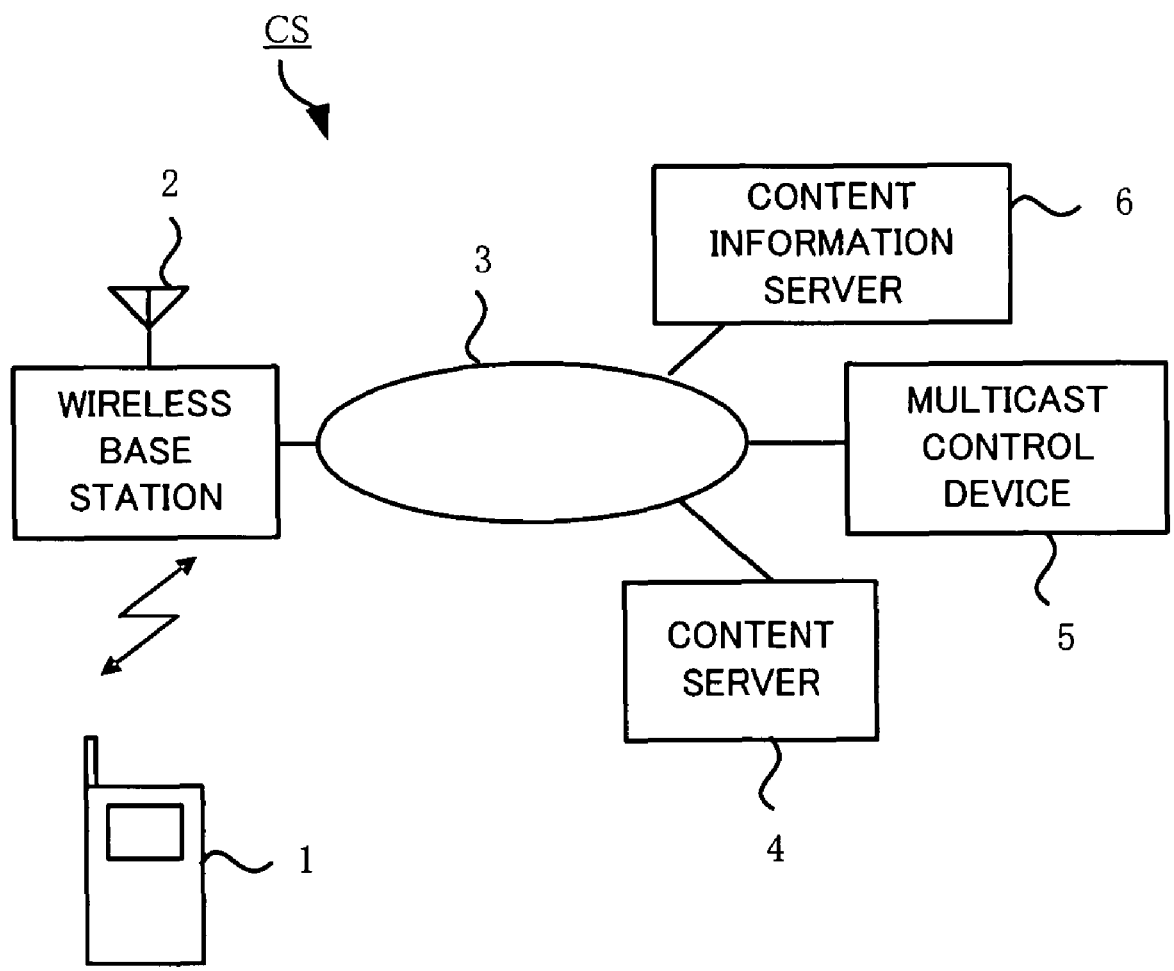
FIG. 1 is a diagram illustrating a system structure according to a first embodiment of the invention.

An explanation will be given of a first embodiment of the invention with reference to FIGS. 1 to 8.

In the first embodiment, a portable terminal 1 searches wireless base stations 2 with which the portable terminal 1 can communicate at a current location, or sectors managed by the wireless base station 2, produces information for specifying the searched wireless base station 2 or sector, and transmits the information to a content information server 6.

The content information server 6 transmits a program table on multicast contents, which are currently transmitted or transmittable by a content server 4 through the wireless base station 2 or sector indicated by the information received from the portable terminal 1, to the portable terminal 1.

The portable terminal 1 receives a multicast content from the content server 4 in accordance with the program table received from the content information server 6.

A mobile communication system CS of the invention has, as illustrated in FIG. 1, the portable terminal 1, the wireless base station 2, a network 3, the content server 4, a multicast control device 5, and the content information server 6.

Although there is one portable terminal 1 illustrated in FIG. 1, plural portable terminals 1 are present.

The portable terminal 1 can communicate with various communication devices over the network 3, such as the Internet, and various local networks, by establishing a wireless communication line with the wireless base station 2.

The portable terminal 1 receives multicast service advertisement information transmitted from the wireless base station 2, and receives a multicast content transmitted from the wireless base station 2 in accordance with that information.

The wireless base station 2 can communicate with, not only the portable terminal 1 one by one through a wireless communication line, but also a plurality of predetermined communication destinations through multicast wireless communication lines (hereinafter, "multicast communication").

The wireless base station 2 transmits the multicast service advertisement information to perform multicast communication.

The multicast service advertisement information includes wireless communication channel information that the wireless base station 2 acquired from the multicast control device 5. The wireless communication channel information is information for specifying a condition when a multicast content is transmitted from the wireless base station 2 to the portable terminal 1 located within an area of the wireless base station 2.

The wireless communication channel information includes, for example, an identifier for specifying a multicast content (hereinafter, "program identifier"), a modulation scheme, an error correction code, and a channel on which the content is transmitted.

The network 3 comprises a telephone network, the Internet, or the like.

The content server 4 has a function of holding multicast contents, and a function of transmitting the multicast contents to the plurality of portable terminals by multicast communication.

The multicast control device 5 holds setting information on multicast contents.

The setting information includes, for example, a program identifier, an IP (Internet Protocol) address used for multicast communication (hereinafter, "multicast IP address"), and a TCP (Transmission Control Protocol) or UDP (User Datagram Protocol) port number.

The setting information also includes the wireless communication channel information which is acquired by the wireless base station 2.

The content information server 6 holds detailed information on a multicast content (hereinafter, "multicast detailed information"). When there are plural content servers 4, the content information server 6 holds plural pieces of multicast detailed information on contents transmitted by the respective content servers 4.

The multicast detailed information represents, for example, a program title, an outline, performers, a transmission start time, transmission end time, and distribution area (the wireless base station 2 which can perform transmission and sector).

The multicast detailed information also includes the wireless communication channel information.

Further, the content information server 6 holds a list of multicast contents transmittable at each sector of the wireless base station 2 (hereinafter, "content list"). That is, the content list is information for specifying a sector where each multicast content is transmittable.

The content information server 6 has an EPG (Electronic Program Guide) creation function of creating an EPG from the detailed information.

Next, the portable terminal 1 will be explained in detail with reference to FIG. 2.

Figure 2:
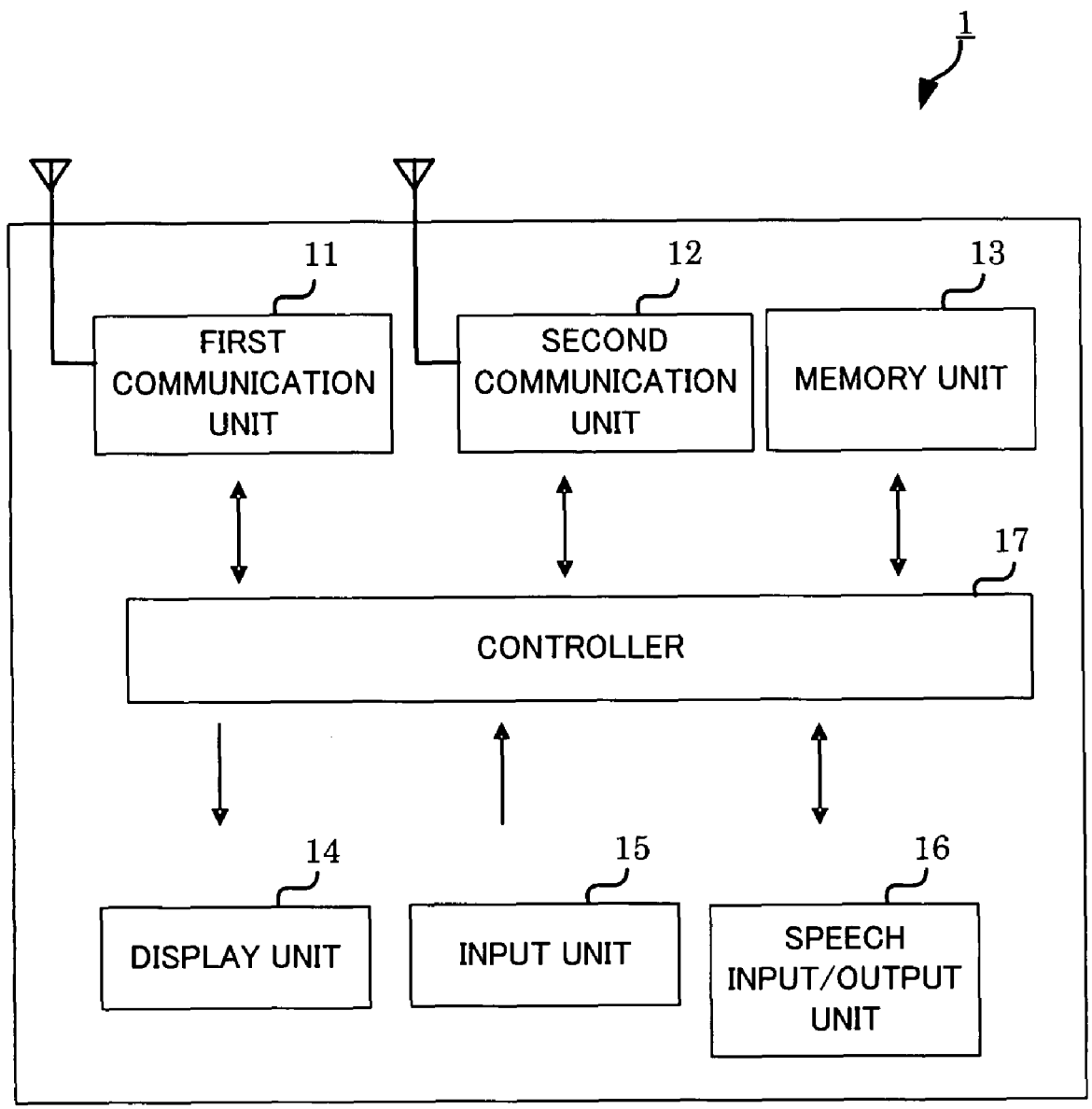
FIG. 2 is a diagram illustrating the structure of a portable electronic device according to the first embodiment of the invention.

Like the circuit structure illustrated in FIG. 2, the portable terminal 1 has a first communication unit 11, a second communication unit 12, a memory unit 13, a display unit 14, an input unit 15, a speech input/output unit 16, and a controller 17.

The first communication unit 11 is to be connected to a wireless/wired communication line, and performs speech communication for calling or the like and data communication for an electronic mail and a web, or the like. The first communication unit 11 has a modulator and a demodulator which perform modulation and demodulation on data to be transmitted/received.

The second communication unit 12 has a modulator and a demodulator which perform modulation and demodulation on data to be transmitted/received, and performs, for example, reception of a multicast content and transmission/reception of a control message necessary for using a multicast service, through a wireless link.

Specifically, the second communication unit 12 receives the multicast service advertisement information transmitted from the wireless base station 2, and acquires information necessary for using the multicast service.

In accordance with a transmission condition of a multicast channel indicated in the multicast service advertisement information, the second communication unit 12 monitors that channel, and receives a multicast content.

Further, the second communication unit 12 transmits control information like transmission start request of a multicast content, and transmission termination notification, to the wireless base station 2.

Note that it is not necessary that the first communication unit 11 and the second communication unit 12 are separate modules, and they may be constituted by a single module which functions as both. This miniaturizes the portable terminal 1.

The memory unit 13 stores a program, a speech, a video, a mail, a web, user data, and the like. The memory unit 13 may be constituted by either one of a built-in memory of the portable terminal 1 and removable external memory.

The display unit 14 comprises, a display panel, such as an LCD (Liquid Crystal Display) panel or an EL (Electro Luminescence) display, and a driver circuit, and displays the video of a received multicast content, an electronic mail, a web, a basic operation screen, and the like. The display unit 14 may have a plurality of display screen like a main screen and a sub screen.

The input unit 15 comprises, numeric keys, function keys, a touch panel, and the like, and receives inputs from a user.

The speech input/output unit 16 has a speech input member which converts a speech input signal into an electronic signal, and a speech output member like a speaker which outputs a speech.

The controller 17 comprises a CPU (Central Processing Unit), and controls the general operation of the portable terminal 1 in accordance with an operation program stored in the memory unit 13.

For example, in accordance with a content reproduction program stored in the memory unit 13, the controller 17 reproduces a multicast content received through the second communication unit 12. The controller 17 controls the display unit 14 in such a manner as to display the video of a multicast content, and controls the speech input/output unit 16 in such a manner as to output a speech from the speaker.

Next, the content information server 6 will be explained in detail with reference to FIG. 3.

Figure 3:
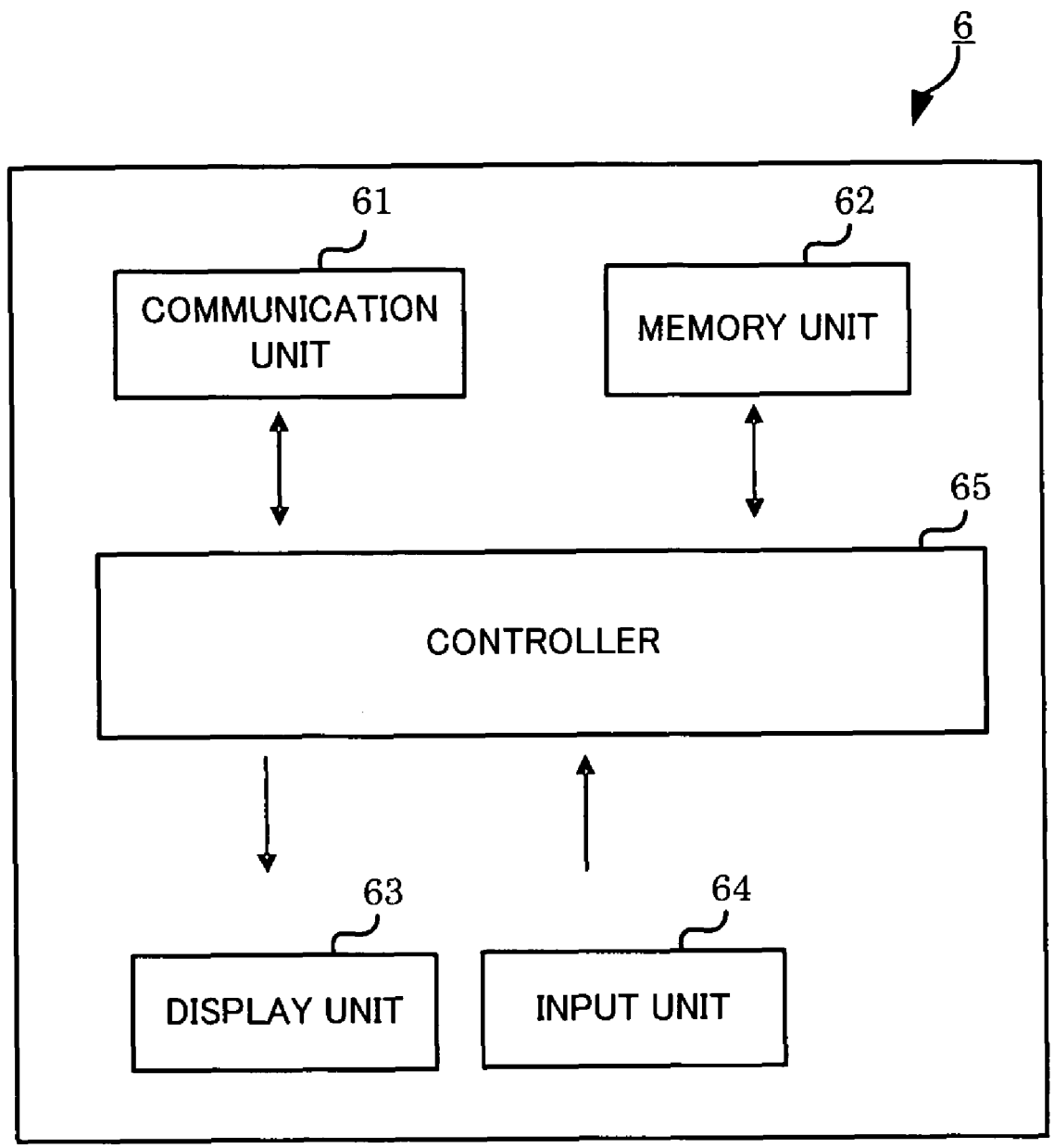
FIG. 3 is a diagram illustrating the structure of a content information server according to the first embodiment of the invention.

Like the circuit structure illustrated in FIG. 3, the content information server 6 has a communication unit 61, a memory unit 62, a display unit 63, an input unit 64, and a controller 65.

The communication unit 61 performs data communication with various communication devices through the network 3.

The memory unit 62 stores programs, the multicast detailed information on a content transmitted by the content server 4, and the like. The multicast detailed information will be discussed in detail later.

The display unit 63 comprises a display panel like an LCD (Liquid Crystal Display) panel or an EL (Electro Luminescence) display, and a driver circuit, and displays, for example, the operation status of a program, a basic operation screen for an operator.

The input unit 64 comprises a keyboard, a mouse, and the like, and receives inputs from the user.

The controller 65 comprises a CPU (Central Processing Unit), and controls the general operation of the content information server 6 in accordance with an operation program stored in the memory unit 62.

Next, the multicast detailed information stored in the memory unit 62 will be explained in detail with reference to FIG. 4.

Like the data structure illustrated in FIG. 4, the multicast detailed information comprises, for example, communication system type information 401, frequency band type information 402, channel number information 403, PN number information 404, transmittable content information 405, and the like.

Note that the PN number information 404 indicates the pattern number of a pseudo random number used for transmission of a multicast content.

The transmittable content information 405 includes plural pieces of information, such as a program identifier, a title (program name), an outline, performers, a transmission start time, a transmission end time, a multicast IP address, a TCP or UDP port number, and a transmission channel.

When a communication system is EV-DO (Evolution Data Only (Optimized)), a frequency band is 800 MHz, and a channel is 100th channel, multicast contents transmittable from the content information server 6 to the portable terminal 1 are divided into three (100 to 200, 400 to 500, and other), in accordance with the PN numbers. That is, the portable terminal 1 which can use the 100th channel at 800 MHz in EV-DO can receive programs A, B, and C within a sector where a PN number other than 100 to 200 and 400 to 500 is used.

The portable terminal 1 can receive the programs A, B within a sector where the PN numbers 100 to 200 are used. The portable terminal 1 cannot receive the program C, but can receive a local program D.

Further, the portable terminal 1 cannot receive all of the programs A, B, C, and D, but can receive a local program E within a sector where the PN numbers 400 to 500 are used.

The multicast detailed information held by the content information server 6 indicates multicast contents receivable at sectors having different communication systems, frequency bands, channel numbers, and PN numbers from one another. The foregoing multicast detailed information is just an example, and the data structure and the structural components are arbitrary as long as the same information is held.

Next, an explanation will be given of an operation when the portable terminal 1 receives a multicast content with reference to FIGS. 5 and 6.

Figure 5:
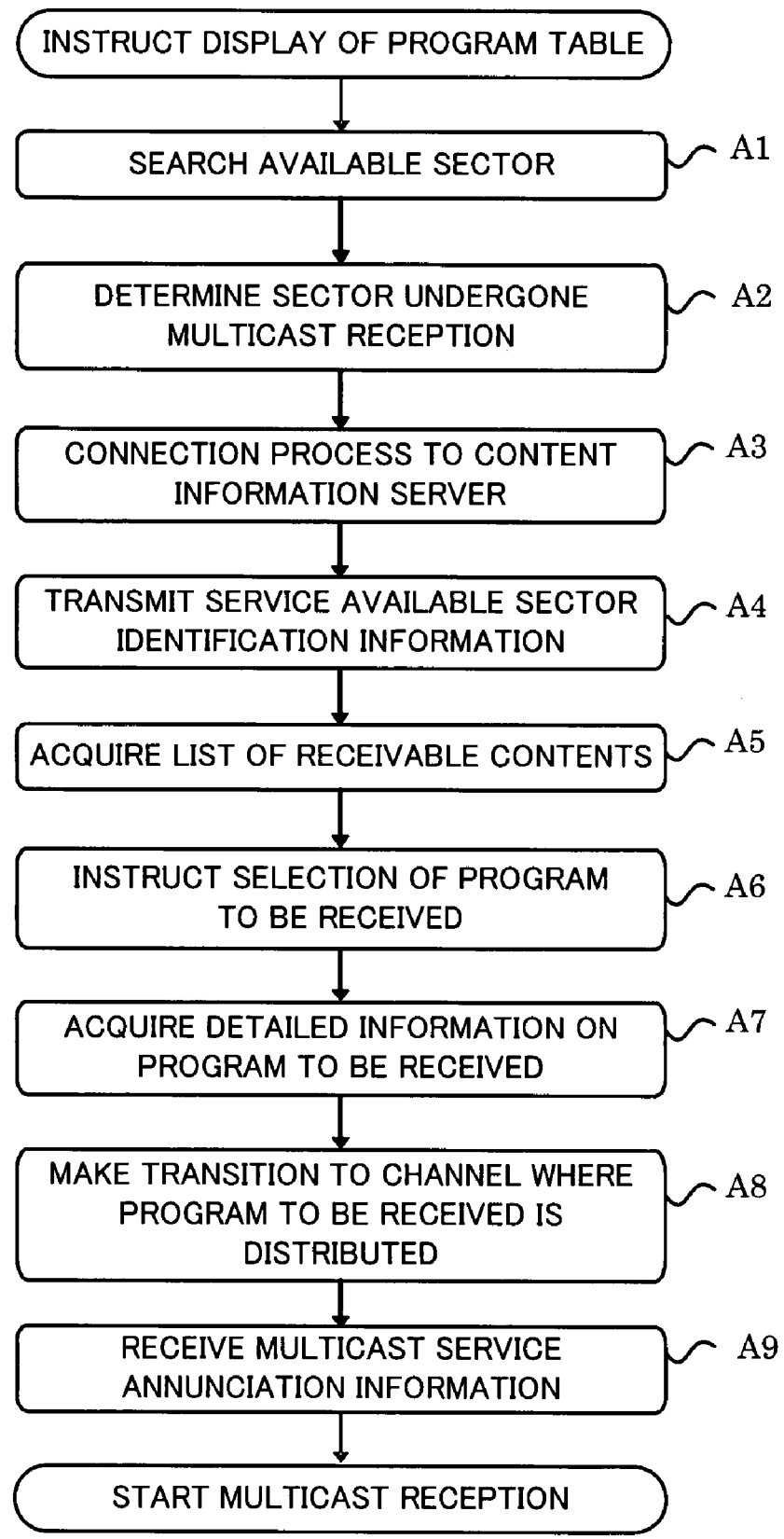
FIG. 5 is a sequence diagram of receiving multicast contents according to the first embodiment of the invention.

A process represented by the flow in FIG. 5 is started when an instruction signal for instructing displaying of a content list on multicast contents receivable at the current location of the portable terminal 1 is output from the input unit 15. At this time, as illustrated in FIG. 6, the display unit 14 displays a screen DP1 representing the content list.

When the flow in FIG. 5 is started, the controller 17 executes a process for determining a channel receivable at a location where the portable terminal 1 is currently located.

First, the controller 17 controls the second communication unit 12 to receive a pilot signal transmitted from the adjacent wireless base station 2, and executes searching of an available sector managed by the wireless base station 2 (acquiring operation) (step A1).

When the portable terminal 1 is compatible with a plurality of communication systems, such as cdma 2000, EV-DO, W-CDMA, and a wireless LAN, the search targets of the process at the step A1 are all or some of the communication systems.

When the portable terminal 1 is compatible with a plurality of frequency bands, such as 800 MHz, 1.7 GHz, and 2 GHz, the search targets of the process at the step A1 are all or some of the frequency bands. When the portable terminal 1 is compatible with a plurality of communication systems and a plurality of frequency bands, a plurality of frequency bands are searched for each communication system.

Further, when the portable terminal 1 can use a plurality of channels (frequencies) in the same communication system and the same frequency band, the search targets are all or some of the channels.

Based on a search result in the step A1, the controller 17 deciding a sector where the portable terminal 1 can currently use a multicast service (hereinafter, "service available sector") (Step A2).

A possible method of deciding a service available sector in the step A2 is, for example, a method of taking all sectors where the pilot signals are tracked by searching or predetermined numbers of sectors extracted from the tracked sectors as service available sectors.

Moreover, all sectors having a larger reception level of the pilot signal than a predetermined value in the sectors detected by searching, or predetermined numbers of sectors extracted therefrom may be taken as service available sectors.

The controller 17 causes the memory unit 13 to store available sector identification information for identifying the service available sectors decided in the step A2. The available sector identification information includes a communication system type, a frequency band, a channel number, a PN number, and the like.

The available sector identification information may be information for specifying the wireless base station 2 or information for specifying the attribute of the wireless base station 2. Possible information for specifying the attribute of the wireless base station 2 is, for example, a group ID when the wireless base station is grouped region by region.

It is not necessary that the processes of the steps A1 and A2 are executed before the process of step A3, but should be executed before the process of step A4.

When having decided the service available sectors in the step A2, the controller 17 controls the first communication unit 11 to execute a connection process to the content information server 6 (step A3).

Figure 6:
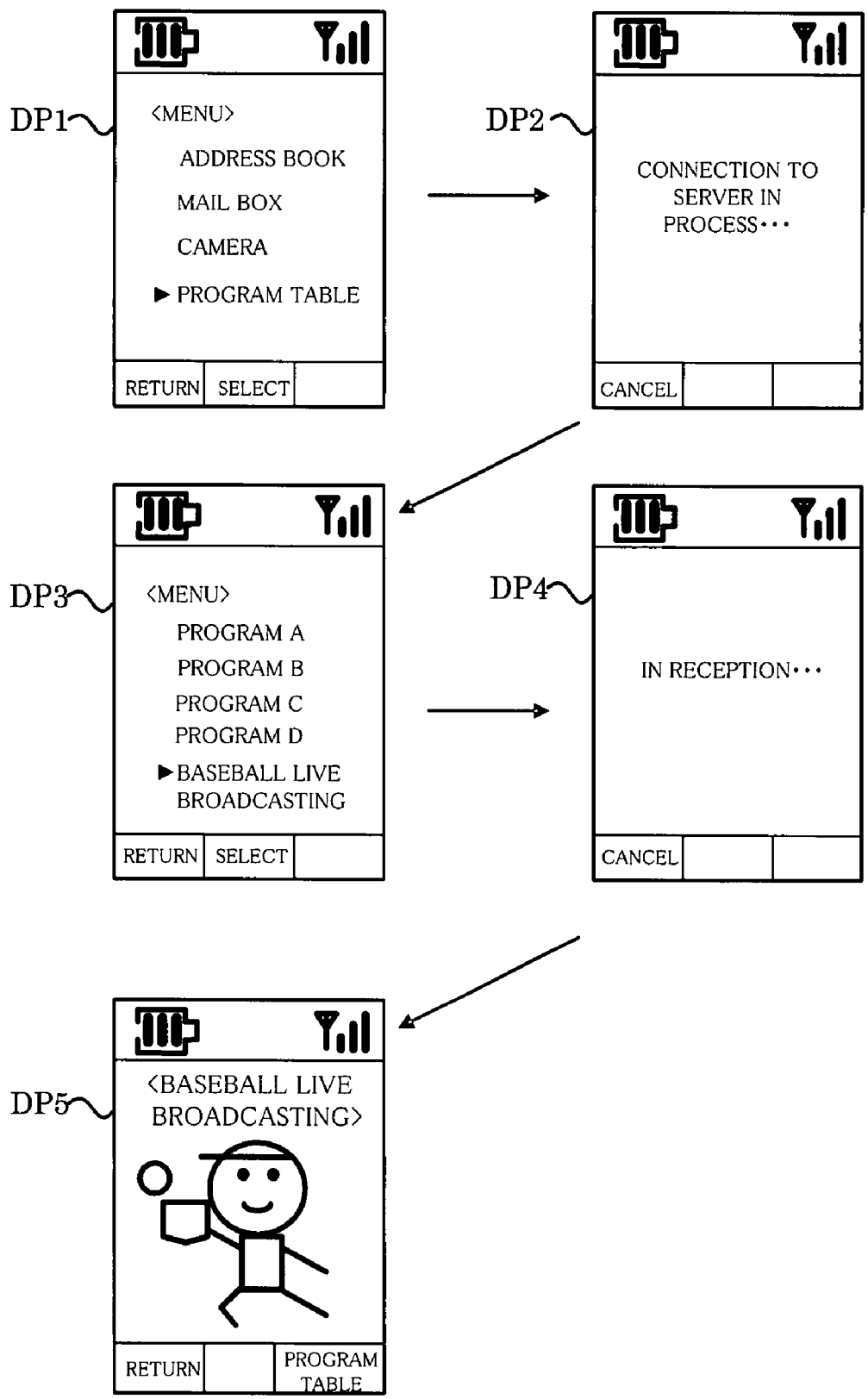
FIG. 6 is a diagram illustrating transitions of a screen display according to the first embodiment of the invention.

A screen DP2 in FIG. 6 is displayed on the display panel of the display unit 14 during the processes from A1 to A4.

When connected to the content information server 6, the controller transmits the available sector identification information to the content information server 6 (step A4).

Based on the available sector identification information received through the communication unit 61, the controller 65 reads out a content list on multicast contents currently transmitted or transmittable from the service available sectors from the memory unit 62, and transmits the list to the portable terminal 1. Those operations will be discussed later in detail.

The first communication unit 11 receives the content list transmitted from the content information server 6 (step A5), and the display unit 14 displays a screen DP3 in FIG. 6, which represents the content list.

When a selection instruction signal for selecting a multicast content that the user wants to receive is output from the input unit 15 through the screen DP3 in accordance with user's manipulation (step A6), the controller 17 requests the content information server 6 to transmit multicast detailed information on the selected multicast content (step A7). It is supposed in the first embodiment that the content of "baseball live broadcasting" is selected.

As illustrated in FIG. 4, the multicast detailed information requested in the step A7 includes a program identifier, a multicast IP address, a TCP or UDP port number, a frequency band, a channel for transmitting a multicast content, and the like.

The multicast detailed information is acquired after the user selects the multicast content in the first embodiment, but may be acquired through the process of the step A5.

When acquiring the multicast detailed information requested to the content information server 6, the controller 17 executes a transition process to a channel where the multicast content indicated by the multicast detailed information is transmitted (step A8).

This shortens a waiting time until receiving the multicast content in comparison with receiving multicast service advertisement information at a channel prior to transition, and referring the multicast service advertisement information to make transition to a desired channel.

The channel transition process includes switching over of a communication system, transition of a frequency band, and the like as necessity.

When the transition process to the desired channel has been completed, the portable terminal 1 receives multicast service advertisement information from the wireless base station 2 at that channel (step A9). The display unit 14 displays a screen DP4 in FIG. 6 during the processes from the step A7 to the step A9.

Thereafter, the second communication unit 12 receives the multicast content, and displaying of a screen according to the multicast content and output of a speech are performed. In the first embodiment, a screen DP5 corresponding to the content for baseball live broadcasting and illustrated in FIG. 6 is displayed on the display unit 14.

Figure 7:
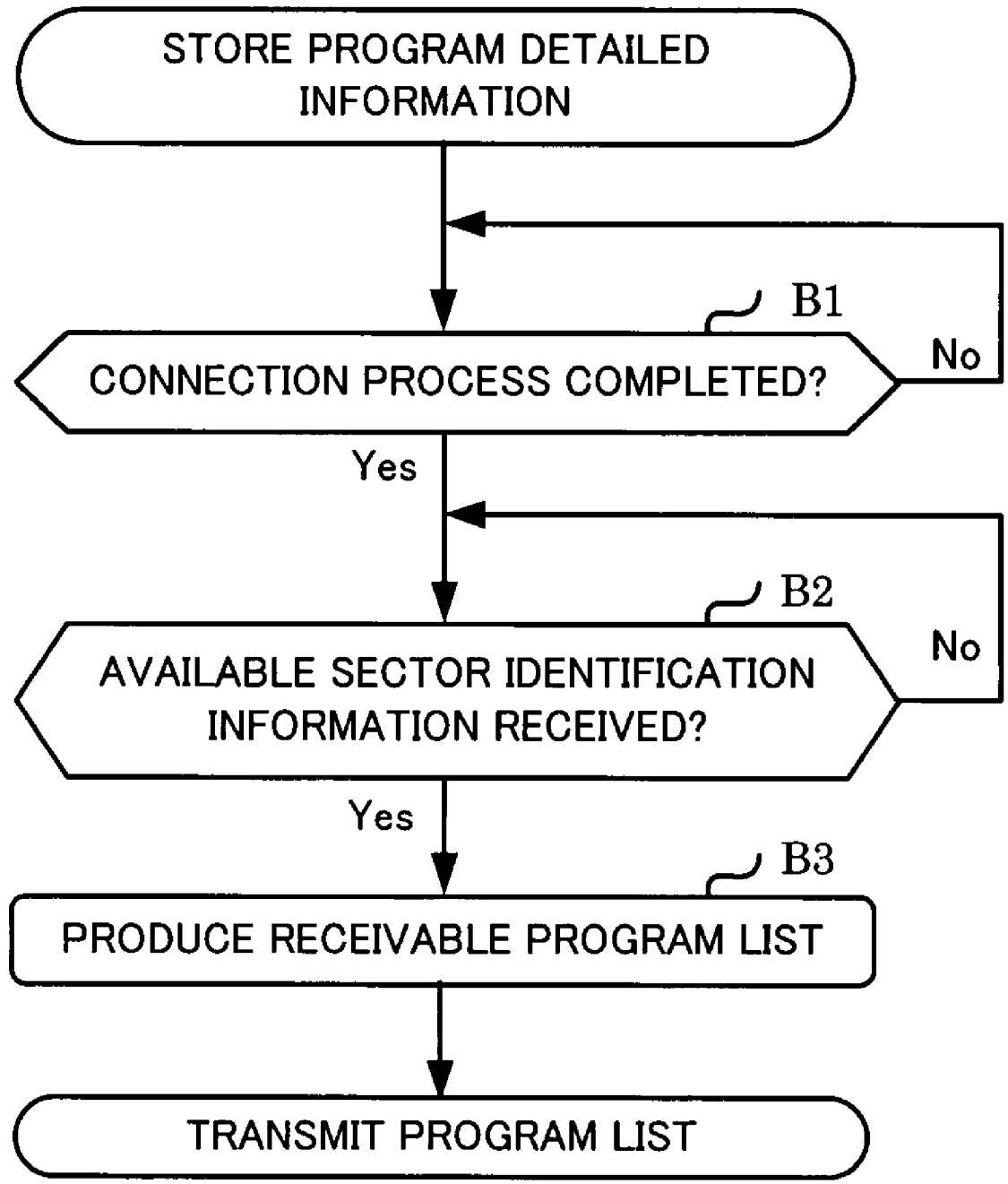
FIG. 7 is a sequence diagram for a process of the content information server according to the first embodiment of the invention.

Next, an explanation will be given of the operation of the content information server 6 which supplies a content list to the portable terminal 1 with reference to FIG. 7.

It is presupposed that the memory unit 62 stores the multicast detailed information (FIG. 4) transmitted by the content server 4 beforehand.

The content information server 6 determines whether or not connection is requested from the portable terminal 1 and a connection process is completed (step B1). When the connection is not requested from the portable terminal 1 and the connection process is not completed (step B1: No), the content information server 6 stands by until the connection process is completed.

When the connection is requested from the portable terminal 1 and the connection process is completed (step B1: Yes), the content information server 6 stands by until available sector identification information is notified from the portable terminal 1 (step B2).

When receiving the available sector identification information (step B2: Yes), the content information server 6 produces a content list on multicast contents that the portable terminal 1 can receive from the content server 4 though a sector indicated in the available sector identification information, from data which associates a sector stored in the memory unit 62 with transmittable multicast contents (step B3), and transmits the list to the portable terminal 1.

For example, it is supposed that the portable terminal 1 notifies the content information server 6 that radio waves of i) a sector of EV-DO, 800 MHz band, 100th channel, PN number=150 or 550 (corresponding to the second and fourth rows in FIG. 4), ii) EV-DO, 800 MHz band, PN of 300th channel=sector 300 (corresponding to sixth row in FIG. 4), iii) W-CDMA, 2 GHz, PN of 350th channel=sector 400 (eighth row in FIG. 4) in the information illustrated in FIG. 4 are receivable.

Figure 8:
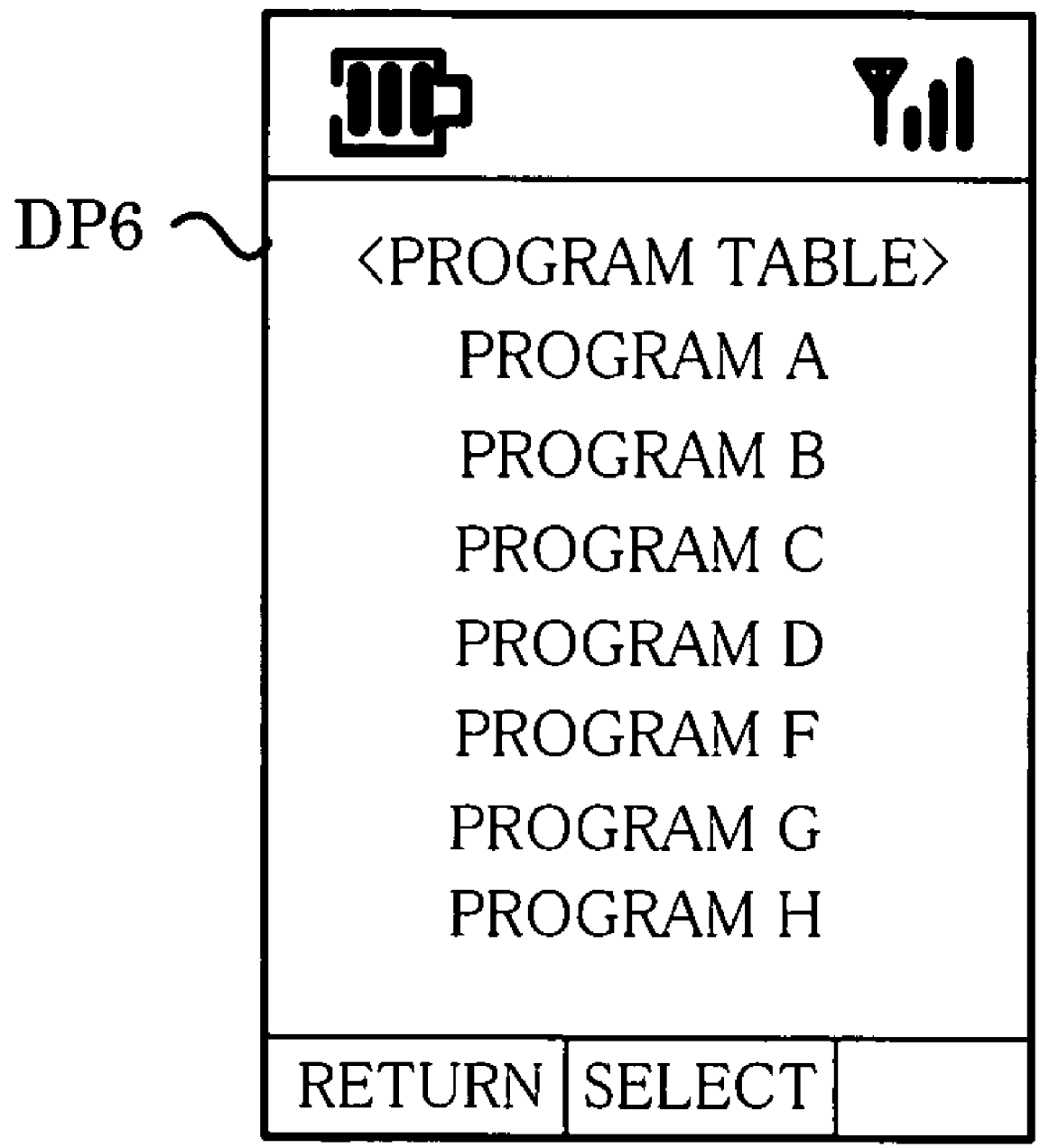
FIG. 8 is a diagram illustrating an example of screen display according to the first embodiment of the invention and the second embodiment thereof.

At this time, the content list transmitted by the content information server 6 is displayed on the display unit 14 as a screen DP6 illustrated in FIG. 8.

This enables acquisition of a content list including only multicast contents receivable at a current location of the portable terminal 1 even if the multicast contents transmitted from the wireless base station 2 differ for each moving destination of the portable terminal 1. That is, it is possible to prevent acquisition of a content list on the multicast contents unreceivable at a current location of the portable terminal 1.

Second Embodiment

Next, a mobile communication system CS according to a second embodiment of the invention will be explained with reference to FIGS. 9 and 10.

The general structure of the mobile communication system CS of the second embodiment, the structure of the portable terminal 1, and that of the content information server 6 are the same as those illustrated in FIGS. 1 to 3, respectively, in the first embodiment. However, a content list on multicast contents that the content information server 6 stores beforehand may not be the content list on the multicast contents transmittable at the individual sectors, as illustrated in FIG. 4.

As illustrated in FIG. 9, multicast detailed information in the second embodiment includes, a program identifier 901, a program name 902, a start time 903, and end time 904, a multicast IP address 905, a TCP or UDP port number 906, and the like.

Like the multicast detailed information used in the first embodiment and illustrated in FIG. 4, the multicast detailed information in the second embodiment may include a communication system type, a frequency band type, a channel number, a PN number, and the like which are for specifying a sector.

The multicast detailed information in FIG. 9 is just an example, and a data structure and a structural component are arbitrary as long as the same information is held.

Next, an explanation will be given of an operation of the portable terminal 1 when receiving a multicast content with reference to the flowchart in FIG. 10.

Figure 10:
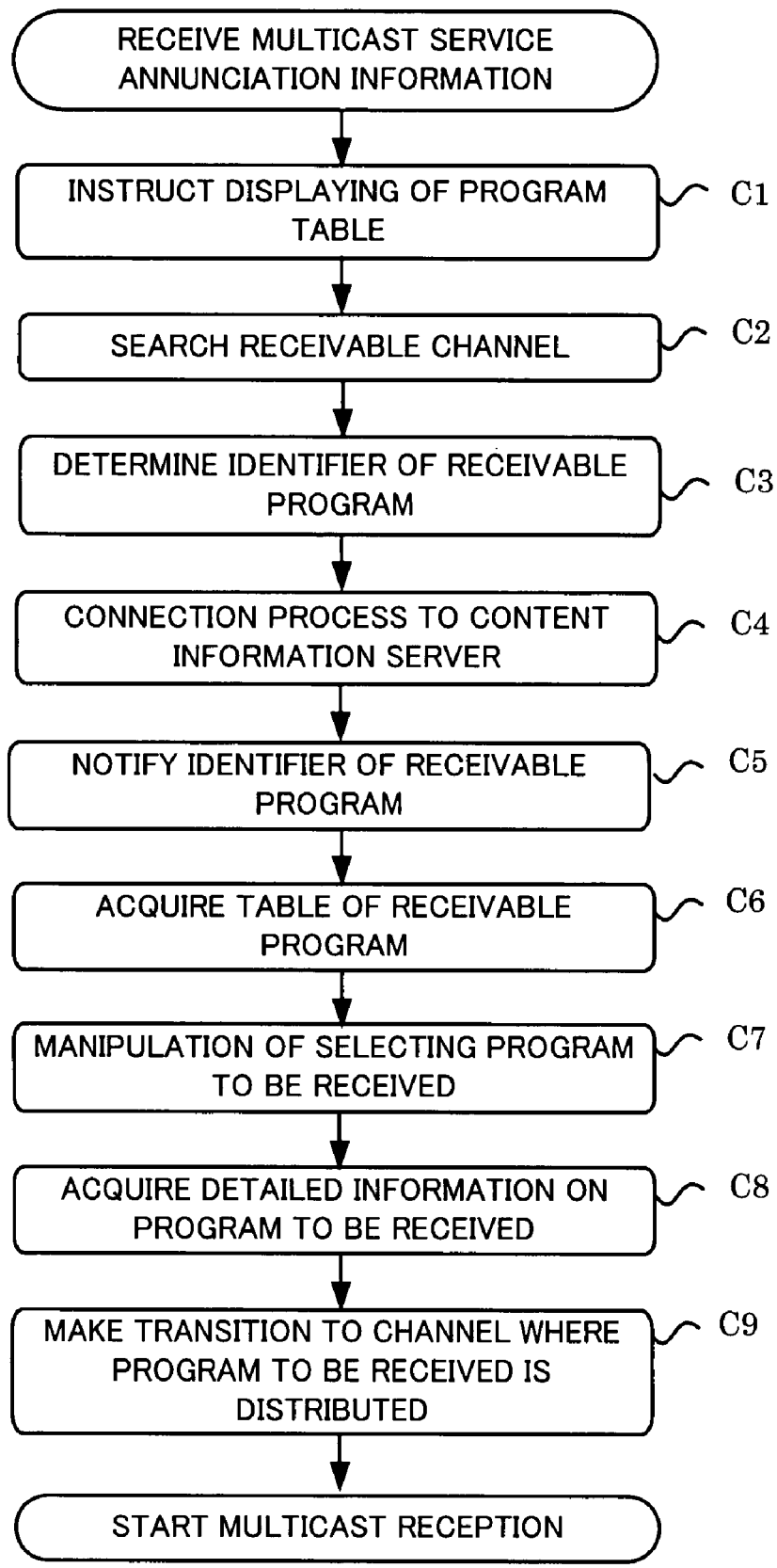
FIG. 10 is a sequence diagram of receiving multicast contents according to the second embodiment of the invention.

The process represented by the flow in FIG. 10 is started when the portable terminal 1 receives multicast service advertisement information transmitted through a sector of the wireless base station 2.

The multicast service advertisement information includes a program identifier for identifying multicast contents transmittable at that sector, and a program identifier for identifying multicast contents transmittable at an adjacent sector. That is, the portable terminal 1 can determine at what frequency band, channel, and sector a multicast content is transmitted based on the multicast service advertisement information.

The multicast service advertisement information also includes a transmission condition of each multicast content (for example, a modulation scheme, an error correction code type).

The controller 17 causes the memory unit 13 to store the multicast service advertisement information received at the sector of the wireless base station 2. When the portable terminal 1 is compatible with a plurality of communication systems, multicast service advertisement information is received for each receivable communication system.

After the multicast service advertisement information is received, when a signal instructing displaying of a content list on multicast contents receivable at a current location is output from the input unit 15 by user's manipulation (step C1), the controller 17 starts searching receivable channels at the current location (acquiring operation) (step C2).

The search process (step C2) is the same as the process of the steps A1 to A2 in FIG. 5.

The portable terminal 1 can specify multicast contents transmitted at each sector from the multicast service advertisement information. Further, it is possible to specify from which sector a receivable radio wave is transmitted from a search result in the step C2.

The controller 17 decides multicast contents that the portable terminal 1 is receivable currently based on the multicast service advertisement information and the search result in the step C2 (step C3). The controller 17 causes the memory unit 13 to store the program identifiers of the multicast contents which are determined as receivable.

It is not necessary that the processes of the steps C2, C3 are executed before executing step C4, and may be executed before the process of step C5.

Thereafter, a connection process to the content information server 6 is executed (step C4). The step C4 is the same as the step A3 in FIG. 5.

When the connection process to the content information server 6 is completed, the portable terminal 1 notifies the program identifiers of the receivable multicast contents stored in the step C3 to the content information server 6 (step C5).

The content information server 6 produces a content list on the receivable multicast contents for the portable terminal 1 from the received program identifiers and a multicast content overall list stored beforehand, and transmits the list to the portable terminal 1. The portable terminal 1 receives the content list transmitted from the content information server 6 (step C6).

When the user manipulates the input unit 15, and selects a multicast content that the user wants to receive from the content list acquired at the step C6 and indicating the receivable multicast contents (step C7), the controller 17 of the portable terminal 1 requests the content information server 6, through the first communication unit 11 and the wireless base station 2, to acquire multicast detailed information on the selected multicast content (step C8).

The multicast detailed information requested at the step C8 is, a multicast IP address, a TCP or UDP port number, or the like. Although the multicast detailed information is acquired after the multicast content to be received is selected in the second embodiment, multicast detailed information on all multicast contents may be acquired when a content list on receivable multicast contents is acquired through the process in the step C6.

The controller 17 executes a transition process to a channel where the desired multicast content is transmitted based on the multicast detailed information acquired through the request in the step C8 and the content list received in the step C6 (step C9). In the channel transition process in the step C9, switching over of a communication system, transition of a frequency band may be executed as necessity.

A channel subjected to the transition may be determined based on the transmission channel of each multicast content indicated by the multicast service advertisement information received when the process represented by the flow in FIG. 10 is started.

Alternatively, the multicast detailed information acquired from the content information server 6 in the step C8 may be used.

When the transition process to the desired channel has been completed, the controller 17 starts receiving the multicast content, and performs screen display and speech output according to the multicast content. New multicast service advertisement information may be received before starting reception of the multicast content.

Figure 11:
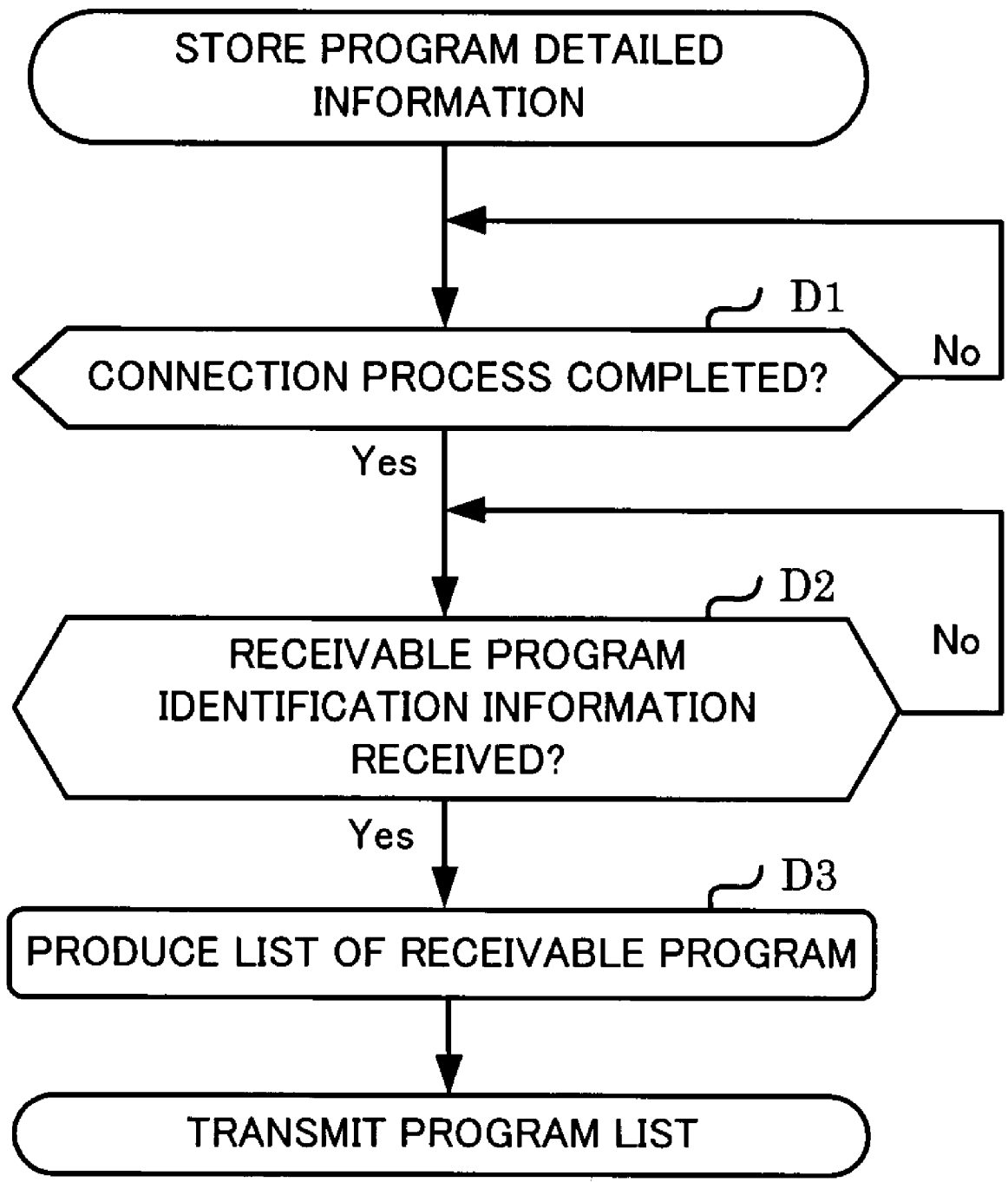
FIG. 11 is a sequence diagram for a process of a content information server according to the second embodiment of the invention.

Next, an explanation will be given of an operation of the content information server 6 which supplies a content list to the portable terminal 1 with reference to the flowchart of FIG. 11.

It is presupposed that the memory unit 62 has stored the multicast detailed information transmitted from the content server 4 beforehand.

It is determined whether or not a connection request from the portable terminal 1 is completed (step D1). When no connection is requested from the portable terminal 1 and a connection process is not completed (step D1: No), the content information server 6 stands by until the connection process is completed.

When connection is requested from the portable terminal 1 and the connection process is completed (step D1: Yes), the content information server 6 stands by until the program identifiers of receivable multicast contents are notified from the portable terminal 1 (step D2).

When receiving the program identifiers of the receivable multicast contents (step D2: Yes), the content information server 6 produces a content list of the multicast contents that the portable terminal 1 can receive based on the multicast detailed information stored in the memory unit 62 (step D3).

The content information server 6 transmits the content list produced through the process in the step D3 to the portable terminal 1.

For example, with reference to FIG. 9, when the portable terminal 1 notifies 100, 110, 120, 130, 150, 160, and 170 as the program identifiers 901 of the receivable multicast contents to the content information server 6, the display unit 14 displays a screen DP6 illustrated in FIG. 8 as the list of the multicast contents (program table) transmitted from the content information server 6.

This enables the portable terminal 1 of the invention to acquire the content list only including the multicast contents receivable at the current location of the portable terminal 1. That is, it is possible to prevent the portable terminal 1 from acquiring a content list which includes multicast contents unreceivable at the current location of the portable terminal 1.

In determining a sector where a radio wave is receivable in the step C3, determination may be made based on the transmission condition of each multicast content acquired at the time of starting up of the process represented by the flow in FIG. 10.

For example, determination is made for whether or not multicast contents are receivable, not based on whether or not a pilot signal is acquired, but it may be determined that multicast contents are not receivable when the pilot signal can be acquired but the received signal strength thereof is less than a predetermined value in case that a modulation scheme or an error correction code whose error tolerance is weak are used.

This reduces a possibility of acquiring a content list, which indicates unreceivable multicast contents, from the content information server 6.

According to the embodiment, even if the user does not make particular manipulation, acquisition of information on contents receivable at a current location of the portable terminal 1 becomes possible, and acquisition of information on contents not receivable at the current location is avoided as much as possible.

Therefore, according to the invention, there are provided a portable electronic device which improves usability in using a multicast service, and a content information server, a content list providing method and a recording medium relating to the portable electronic device.

The invention is not limited to the foregoing embodiments, and can be modified and changed in various forms.

The contents and format of information related to multicast contents can be changed arbitrarily. The structure and operation procedure of each device can also be changed arbitrarily if the same functions can be realized.

The invention is not limited to an exclusive computer system, but can be applied to arbitrary electronic devices.

That is, a computer program which allows a computer to function and operate as the portable terminal 1 may be produced, distributed, subjected to lending, and installed on the computer, and the computer may be used, handed over, and subjected to lending as the portable terminal 1.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-101182 filed on Mar. 31, 2006 and including specification, claims, drawings and summary. The disclosure of the above Japanese Patent Application is incorporated herein by reference in its entirety.

What is claimed is:

1. A portable electronic device comprising:
   a base station and sector detection unit that detects, in response to manipulation by a user, at least one of a wireless base station and a sector managed by the wireless base station which can communicate with the portable electronic device at a current location thereof;
   a base station information transmission unit that produces base station and sector identification information for identifying at least one of the base station and the sector detected by the base station and sector detection unit, and transmits a part or whole of the base station and sector identification information to a content information server;
   a list reception unit that receives a content list, which represents a list of contents distributed by an information distribution device through at least one of the wireless base station and the sector indicated by the base station identification information transmitted from the base station information transmission unit, from the content information server;

an output unit that outputs the content list received by the list reception unit;

a content selection unit that selects, in response to manipulation by the user, a content from the contents indicated in the content list output by the output unit in accordance with manipulation of a user; and a content reception unit that receives the content selected by the content selection unit from the information distribution device through at least one of the wireless base station and the sector detected by the base station detection unit.

2. A portable electronic device comprising:

a base station and sector detection unit that detects, in response to manipulation by a user, at least one of a wireless base station and a sector managed by the wireless base station which can communicate with the portable electronic device at a current location thereof;

a content-identification-information transmission unit that transmits a part or whole of content identification information, which indicates contents distributed by an information distribution device through at least one of the wireless base station and the sector detected by the base station and sector detection unit within a range where communication with at least one of the wireless base station and the sector is possible, to a content information server;

a list reception unit that receives a content list, which is produced based on the content identification information transmitted by the content-identification-information transmission unit and represents a list of contents distributed by the information distribution device through at least one of the wireless base station and the sector detected by the base station and sector detection unit, from the content information server;

an output unit that outputs the content list received by the list reception unit;

a content selection unit that selects, in response to manipulation by the user, a content from the contents indicated in the content list output by the output unit in accordance with manipulation of a user; and a content reception unit that receives the content selected by the content selection unit from the information distribution device through one of the wireless base station and the sector detected by the base station detection unit.

3. A content information server comprising:

a content-detailed-information storing unit that stores base station and sector identification information for identifying at least one of a wireless base station and a sector managed by the wireless base station and information representing a detail of a content distributed by an information distribution device through at least one of the wireless base station and the sector, in association with each other;

a base station and sector information reception unit that receives, from a portable electronic device, a part or whole of base station and sector identification information for identifying at least one of a wireless base station and a sector which can communicate with the portable electronic device at a current location thereof during manipulation by a user;

a list producing unit that produces a content list indicating a content distributed by the information distribution device through one of a wireless base station and a sector which can communicate with the portable electronic device at a current location thereof based on the base station and sector identification information received by the base station and sector information reception unit and information stored in the content-detailed-information storing unit; and a list transmission unit that transmits the content list produced by the list producing unit to the portable electronic device.

4. The content information server according to claim 3, wherein the information on a content and stored in the content-detailed-information storing unit includes at least a multicast IP address used for distribution of the content.

5. The content information server according to claim 3, wherein the information on a content and stored in the content-detailed-information storing unit includes any one of a content title, an outline, a distribution start time, a distribution end time, and information for specifying a distribution sector.

6. The content information server according to claim 5, wherein the information for specifying a distribution sector includes any one of information for specifying a frequency band, information for specifying a channel, and information for specifying a pseudo random number for frequency diffusion modulation.

7. A content information server comprising:

a content-detailed-information storing unit that stores information on a detail of a content distributed by an information distribution device through at least one of a wireless base station and a sector managed by the wireless base station;

a content-identification-information reception unit that receives, from a portable electronic device, content identification information representing a content distributed by an information distribution device though one of a wireless base station and a sector within a range where communication with one of the wireless base station and the sector, which can communicate with the portable electronic device at a current location thereof during manipulation by a user, is possible, a list producing unit that produces a content list indicating a content distributed by the information distribution device through one of a wireless base station and a sector which can communicate with the portable electronic device at a current location thereof based on the content identification information received by the content-identification-information reception unit and information stored in the content-detailed-information storing unit; and a list transmission unit that transmits the content list produced by the list producing unit to the portable electronic device.

8. A content list providing method comprising:

a content-detailed-information storing step where a content information server stores an associational relationship between at least one of a wireless base station and a sector managed by the wireless base station and information on a detail of a content distributed by an information distribution server through at least one of the wireless base station and the sector;

a base station detection step where a portable electronic device detects at least one of the wireless base station and the sector which can communicate with the portable electronic device at a current location thereof during manipulation by a user;

a base station and sector information transmission step where the portable electronic device produces base station and sector identification information for identifying at least one of the wireless base station and the sector detected in the base station and sector detection step, and transmits a part or whole of the base station and sector identification information to the content information server;

a base station and sector information reception step where the content information server receives the base station and sector identification information transmitted in the base station and sector transmission step;

a list production step of producing a content list indicating contents distributed by the information distribution device through at least one of the wireless base station and the sector which can communicate with the portable electronic device at a current location thereof based on the base station and sector identification information received in the base station and sector information reception step and information stored in the content information storing step;

a list transmission step of transmitting the content list produced by the list production step from the content information server to the portable electronic device;

a list reception step where the portable electronic device receives the content list transmitted in the list transmission step;

an output step of outputting the content list received in the list reception step;

a content selection step of selecting , in response to manipulation by the user, a content from the contents indicated in the content list output in the output step in accordance with manipulation of a user; and a content reception step of receiving the content selected in the content selection step from the information distribution server through one of the wireless base station and the sector detected in the base station detection step.

9. A content list providing method comprising:

a content-detailed-information storing step where a content information server stores information on a detail of a content distributed by an information distribution device through at least one of a wireless base station and a sector managed by the wireless base station;

a base station and sector detection step where a portable electronic device detects at least one of a wireless base station and a sector which can communicate with the portable electronic device at a current location thereof during manipulation by a user;

a content-identification-information transmission step of transmitting content identification information indicating a multicast content distributed by the information distribution device through at least one of the wireless base station and the sector detected in the base station and sector detection step within a range where communication with at least one of the wireless base station and the sector is possible from the portable electronic device to the content information server;

a content-identification-information reception step where the content information server receives the content identification information transmitted in the content-identification-information transmission step;

a list production step of producing a content list indicating contents distributed by the information distribution device through at least one of the wireless base station and the sector which can communicate with the portable electronic device at a current location thereof based on the content identification information received in the content-identification-information reception step and information stored in the content-detailed-information storing step;

a list transmission step of transmitting the content list produced in the list production step from the content information server to the portable electronic device;

a list reception step where the portable electronic device receives the content list transmitted in the list transmission step;

an output step of outputting the content list received in the list reception step;

a content selection step of selecting, in response to manipulation by the user, a content from the contents indicated in the content list output in the output step in accordance with manipulation of a user; and a content reception step of receiving the content selected in the content selection step from the information distribution device through one of the wireless base station and the sector detected in the base station and sector detection step.

10. A recording medium storing a program that allows a computer to execute:

a base station and sector detection step of detecting at least one of a wireless base station and a sector managed by the wireless base station which can communicate with the computer at a current location thereof during manipulation by a user;

a base station and sector information transmission step of producing base station and sector identification information for identifying at least one of the wireless base station and the sector detected in the base station and sector detection step, and transmitting the base station identification information to a content information server;

a list reception step of receiving a content list, which represents a list of contents distributed by an information distribution device through at least one of the wireless base station and the sector indicated in the base station and sector identification information transmitted in the base station and sector information transmission step, from the content information server;

an output step of outputting the content list received in the list reception step;

a content selection step of selecting, in response to manipulation by the user, a content from the contents indicated in the content list output in the output step in accordance with manipulation of a user; and a content reception step of receiving the content selected in the content selection step from the information distribution device through one of the wireless base station and the sector detected in the base station detection step.

11. A recording medium storing a program that allows a computer to execute:

a base station and sector detection step of detecting at least one of a wireless base station and a sector managed by the wireless base station which can communicate with the computer at a current location thereof during manipulation by a user;

a content-identification-information transmission step of transmitting content identification information, which indicates a multicast content distributed by an information distribution device through at least one of the wireless base station and the sector detected in the base station and sector detection step within a range where communication with at least one of the wireless base station and the sector is possible, to a content information server;

a list reception step of receiving a content list, which is produced based on the content identification information transmitted in the content-identification-information transmission step, and represents a list of contents distributed by the information distribution device through at least one of the wireless base station and the sector detected in the base station detection step, from the content information server;

an output step of outputting the content list received in the list reception step;

a content selection step of selecting, in response manipulation by a content from the contents indicated in the content list output in the output step in accordance with manipulation of a user; and a content reception step of receiving the content selected in the content selection step from the information distribution device through one of the wireless base station and the sector detected in the base station detection step.

12. A recording medium storing a program for allowing a computer, which has a content-detailed-information storing unit storing at least one of a wireless base station and a sector managed by the wireless base station that relays distribution of a content from an information distribution device to a portable electronic device and information on a detail of a content corresponding to at least one of the wireless base station and the sector in association with each other, to execute:

a base station and sector information reception step of receiving, from the portable electronic device, base station and sector identification information for identifying at least one of a wireless base station and a sector which can communicate with the portable electronic device at a current location thereof during manipulation by a user, wherein the portable electronic device receives a content distributed from the information distribution device through at least one of the wireless base station and the sector;

a list production step of producing a content list indicating a content distributed by the information distribution device through at least one of the wireless base station and the sector which can communicate with the portable electronic device at a current location thereof based on the base station and sector identification information received in the base station and sector information reception step and information stored in the content-detailed-information storing unit; and a list transmission step of transmitting the content list produced in the list production step to the portable electronic device.

13. A recording medium storing a program for allowing a computer, which has a content-detailed-information storing unit storing information on a detail of a content distributed from an information distribution device to a portable electronic device through at least one of a wireless base station and a sector managed by the wireless base station, to execute:

a content-identification-information reception step of receiving, from the portable electronic device, content identification information for identifying a content distributed from the information distribution device through at least one of a wireless base station and a sector which can communicate with the portable electronic device at a current location thereof during manipulation by a user within a range where communication with at least one of the wireless base station and the sector is possible a list production step of producing a content list indicating a content distributed by the information distribution device through at least one of the wireless base station and the sector which can communicate with the portable electronic device at a current location thereof based on the content identification information received in the content-identification-information reception step and information stored in the content-detailed-information storing unit; and a list transmission step of transmitting the content list produced in the list production step to the portable electronic device.

\* \* \* \* \*